June 13, 1933.  G. C. STODDARD  1,914,334
STERILIZER
Original Filed April 14, 1927   2 Sheets-Sheet 1

WITNESS:
Rob't P. Kitchel.

INVENTOR
George C. Stoddard
BY
ATTORNEYS.

Patented June 13, 1933

1,914,334

UNITED STATES PATENT OFFICE

GEORGE C. STODDARD, OF BURLINGAME, CALIFORNIA, ASSIGNOR TO THE DE LAVAL SEPARATOR COMPANY, OF NEW YORK, N. Y., A CORPORATION OF NEW JERSEY

STERILIZER

Original application filed April 14, 1927, Serial No. 183,890. Divided and this application filed April 8, 1930. Serial No. 442,478.

It is known to heat water in a vessel, such as a sterilizer, by immersing therein an electric heating element. It is also known to heat the water in a separate casing that contains the heating element and through which a circulation of water is established from and back to the vessel. It is necessary to heat the water to a certain temperature and to hold it at or above that temperature for a minimum predetermined time in order to insure thorough sterilization. It requires careful watching to insure that the desired temperature is reached and maintained. With the cover of the sterilizing vessel applied, a too prolonged application of heat will injure, and may destroy, the heating element. It has been found practicable to control the temperature thermostatically, but ordinary thermostatic control is ineffective to limit the duration of the application of heat. An unnecessarily prolonged application of heat involves serious waste of current, even though the temperature may be automatically controlled.

The object of my invention is to avoid the necessity of careful watching, insure that the desired temperature shall be maintained above a desired minimum temperature for a predetermined time, and avoid overheating, waste of current and danger of damage to the heater element.

A preferred embodiment of my improved sterilizing apparatus is shown in the accompanying drawings, in which—

Figure 1:
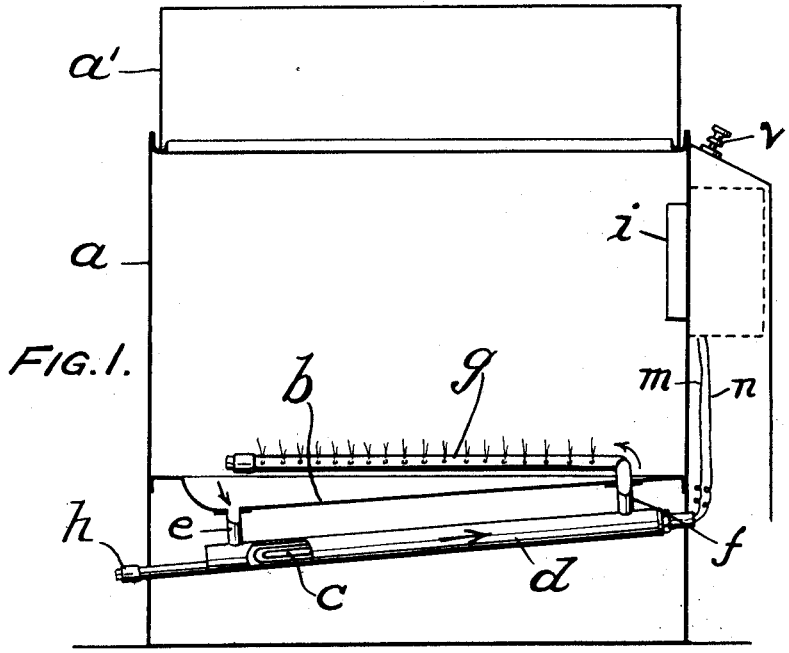
Fig. 1 is a vertical sectional view of a sterilizer, the upper cover part not being completely shown.
Figure 2:
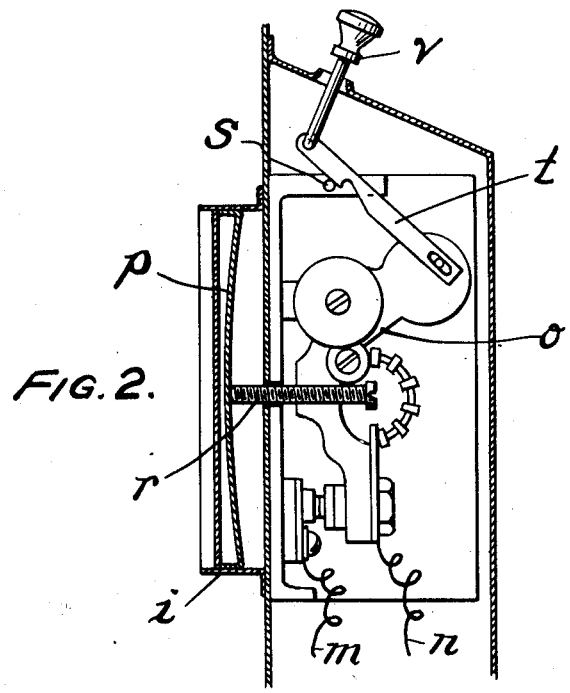
Fig. 2 is a vertical section through the thermostatic control box.

The sterilizer vessel $a$, provided with a cover $a'$ which is foreshortened in its vertical dimension, is provided in its bottom with a groove $b$ having an inclined bottom so that it is relatively deep at one end and gradually diminishes in depth toward the other end. For example, the groove may be 6 or 7 inches wide and of a maximum depth of three inches at one end and taper to nothing at the other end.

Outside and below and spaced from the vessel $a$, and preferably inclined and extending parallel to, and immediately below, the bottom of the groove, is a casing $d$ containing an electrical heating element $c$. The opposite ends of the casing $d$ are provided with two flanged nipples $e$ and $f$ by means of which casing $d$ is secured to the bottom of vessel $a$. Nipple $e$, at the lower end of casing $d$, communicates with the interior of vessel $a$ at the deep end of groove $b$. Nipple $f$, at the higher end of casing $d$, extends through the bottom of the shallow end of groove $b$ and supports the L end of a perforated pipe $g$, which extends, preferably in a horizontal direction, along and immediately above groove $b$. A drain plug and nipple $h$ extends from the lowest end of casing $d$, and collects dirt and sediment which may settle by gravity at this end.

In an enclosed box $i$, above the head of heating element $c$, is placed a thermostat of the diaphragm expansion type. The thermostat comprises switch contacts $m$ and $n$ connected electrically with element $c$. One of the contacts $m$ is fixed and the other $n$ is on the end of a lever $o$. Lever $o$ carries a threaded rod $r$, which, normally, nearly touches a diaphragm $p$, which, when it expands, engages rod $r$ and thereby actuates lever $o$. Diaphragm $p$ is hollow and contains ethyl alcohol or other suitable liquid convertible into a vapor at a low temperature. It expands when a certain temperature (say 205–209 degrees F.) is reached within vessel $a$ and in the movement of its expansible wall swings lever $o$ on its pivot and retracts contact $n$ from contact $m$, thereby opening the circuit to heating element $d$. Lever $o$ carries at its other end a trip hook or trigger $t$ having a notch which, when the lever is swung as described, engages a fixed pin $s$ and holds lever $o$ from returning after the temperature drops below the temperature at which the diaphragm is held expanded. By means of the hand-operable rod $v$, the switch mechanism may be reset.

The hot water and steam surge through the heater element in the course indicated by the arrows and are discharged through the perforations in pipe *g*. It is found decidedly advantageous to enclose the heating element in a casing separate from the sterilizer vessel and of restricted size rather than to immerse it in a trough in the bottom of the sterilizer vessel. In the latter case, the water must actually boil before the temperature in the sterilizer will rise to the desired degree, whereas in the construction shown, steam can be generated and delivered in a comparatively short time, say 30 or 35 seconds.

It is always advisable, and in some States the law requires, that the temperature shall remain above a given temperature, say 170 degrees F., for a given time, say fifteen minutes. It is difficult and unnecessary, and moreover undesirable, to hold the temperature stationary at just above the minimum for a predetermined time. In my invention, the desired result is produced by allowing the fluid to heat up to above the desired minimum and then cut off the application of heat and allow it to drop to the desired minimum; the maximum degree of heat being such that the time required to heat from minimum to maximum and cool down from maximum to minimum will equal or exceed the minimum time to which the fluid is to be heated above the minimum. The thermostatic control herein described affords a ready means for insuring such operation automatically.

The operation of the sterilizer comprises the following cycle of operations:

If the operator desires to secure hot water for washing, any desired quantity of water is run into vessel *a*.

The electric circuit to heater *c* is then closed and is maintained closed until the water is at the desired temperature. If the operator should fail to open the circuit, the thermostatic control will effect the opening, and, if the cover is on, will act to save element *c* from injury.

After the circuit is opened, the desired amount of hot water is removed, leaving in the vessel the amount desired for the sterilizing operation.

The milk cans, or other articles to be sterilized, are then placed in the sterilizer and the cover put on.

The current is then again turned on. The temperature inside vessel *a* rises to the predetermined point (say 200 to 210 degrees F.) at which the diaphragm *p* suddenly expands, which swings lever *o*, opens the switch *m*, *n*, and engages trip hook *t* with pin *s* and holds the switch open.

The temperature within the vessel then drops.

Not only does the thermostatic control protect the heater element and insure that the articles to be sterilized shall be subjected to a temperature above a predetermined minimum for a predetermined time, but it avoids waste of current.

Figure 3:
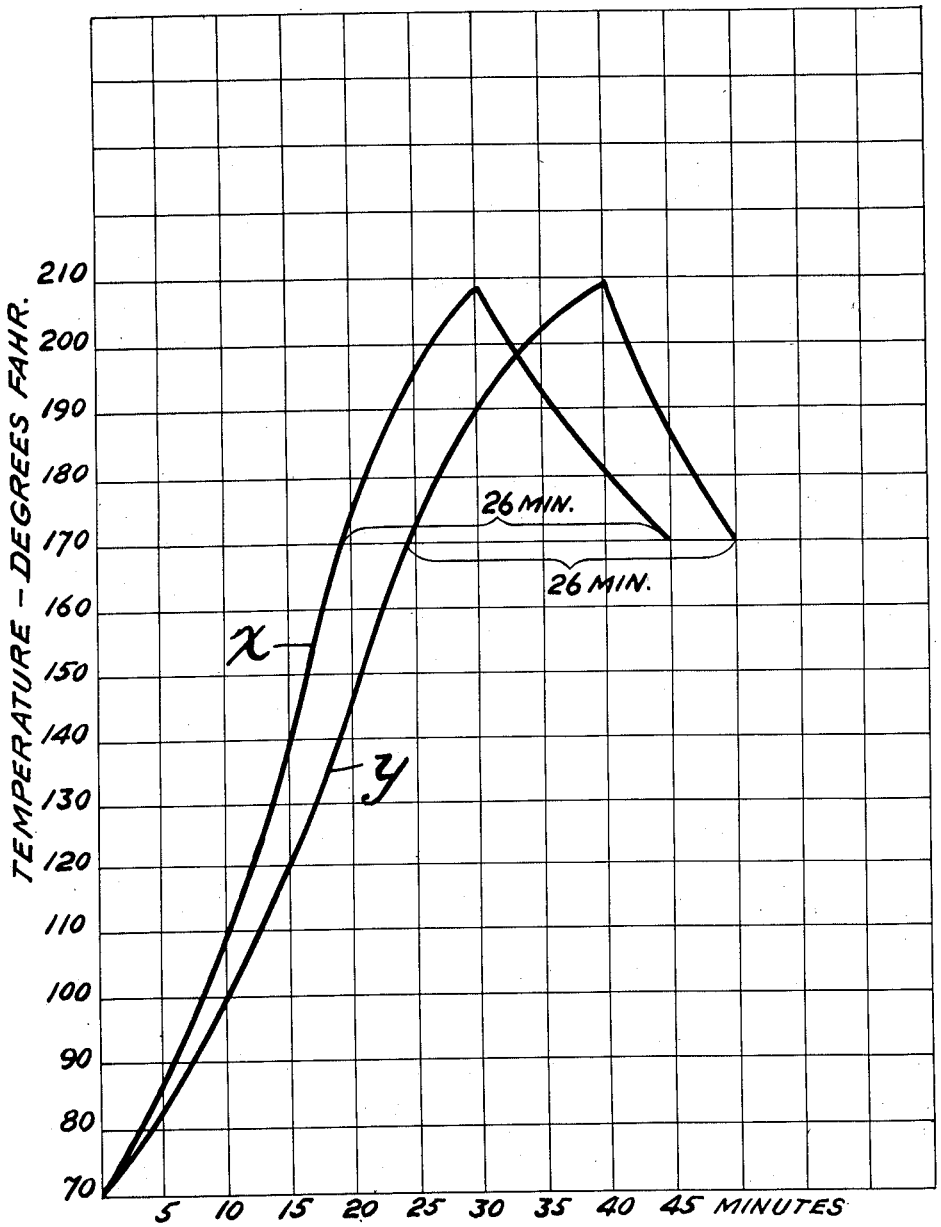
Fig. 3 is a diagram illustrative of the operation.

The apparatus above described is especially adapted to so control the application of heat as to secure certain important advantages, other than those hereinbefore enumerated, which are not at once apparent. Thus, the temperature of the room in which the sterilizing process takes place may vary within wide limits. It is uneconomical to insulate the vessel. It is obvious that with a warm external atmosphere, the temperature will rise more rapidly and fall more slowly, than with a cold external atmosphere. It has been found that, in the operation of my invention, the elapsed time between the rise and the return to minimum temperature will be about the same regardless of external temperature conditions. In Fig. 3 plotted curves illustrate such comparative operations; curve *x* showing the elapsed time above a minimum temperature under conditions of comparatively slow heat radiation and curve *y* showing the elapsed time above a minimum temperature under conditions of rapid heat radiation.

It has also been experimentally shown that this desirably fixed factor varies but little whether or not articles to be sterilized are placed within the vessel. Experiment seems to show that with no "load" the duration of effective sterilizing conditions is slightly less than with "load". However, the variation is so slight under all imaginable variable conditions that it is only necessary to provide, under any conditions, for the maintenance of sterilizing temperatures for a somewhat longer time than the required minimum, and it is thereby made certain that this time will not fall below the required minimum under any other condition.

The new method, herein described, of heating articles to be sterilized and which, by the use of the improved sterilizing apparatus herein described and claimed, is carried out with maximum efficiency, forms the subject-matter of another application, filed April 14, 1927, Serial No. 183,890, of which this application is a division.

Having now fully described my invention, what I claim and desire to protect by Letters Patent is:

1. In a sterilizer, the combination with a sterilizer vessel, of a casing outside the vessel, an electric heater element within the casing, means providing for fluid circulation from the interior of the vessel through the casing and thence back to the interior of the vessel, a switch for opening and closing the circuit to the heater element, a diaphragm in operative relation with a fluid which is in liquid phase below, and in vapor phase above, a given temperature, said diaphragm being operable upon the conversion of liquid into vapor to open the switch and tending to operate to close the switch when said vapor is reconverted to a liquid, and means operating automatically to hold the switch open when it is opened by the diaphragm and which is manually releasable to allow the diaphragm to close the switch when the contained fluid is in liquid phase.

2. In a sterilizer, the combination with a sterilizer vessel, of a casing outside the vessel, an electric heater element within the casing, means providing for fluid circulation from the interior of the vessel through the casing and thence back to the interior of the vessel, a switch for opening and closing the circuit to the heater element, a diphragm, temperature-controlled means adapted, when the temperature within the vessel rises to a predetermined degree, to actuate the diaphragm, means operable by the so actuated diaphragm to open the switch, and manually releasable means adapted to hold the switch in open position during the fall of temperature succeeding the opening of the switch.

3. In a sterilizer, the combination with a sterilizer vessel adapted to contain fluid and articles to be sterilized, of an electrically operated element for heating the fluid to raise the temperature within the vessel substantially above the desired minimum temperature of sterilization, an electric circuit connected with said element, a thermostatically controlled device, a switch for opening and closing said circuit, a connection between said thermostatic element and said switch whereby said switch is positively opened and closed by said thermostatic element, and manually releasable means adapted to hold the switch open and prevent the same being closed by the thermostatic element until said means is manually released.

4. In a sterilizer, the combination with a sterilizer vessel, of a casing outside the vessel, an electric heater element within the casing, means providing for fluid circulation from the interior of the vessel through the casing and thence back to the interior of the vessel, a switch lever for opening and closing the circuit to the heater element, a diaphragm in operative relation with a liquid which is convertible into a gas at a given temperature, said diaphragm being actuable, when said liquid is so converted into a gas, to open the switch lever, a pin, a trigger carried by the switch lever and adapted, in the opening movement of the switch lever, to engage said pin and hold the switch lever in an open position, and manually operable means to disengage the trigger and pin.

In testimony of which invention, I have hereunto set my hand, at San Francisco, Calif., on this 29th day of March, 1930.

GEORGE C. STODDARD.